United States Patent [19]

Merkle

[11] 4,310,171
[45] Jan. 12, 1982

[54] VEHICLE AXLE ATTACHMENT

[75] Inventor: Ralph H. Merkle, Brighton, Mich.

[73] Assignee: General Motors Corporation, Detroit, Mich.

[21] Appl. No.: 158,397

[22] Filed: Jun. 11, 1980

[51] Int. Cl.³ .............................................. B60G 1/00
[52] U.S. Cl. ................................ 280/688; 267/21 R; 280/716
[58] Field of Search ..................... 280/81 R, 683, 684, 280/685, 686, 687, 702, 715, 716, 718, 721, 724, 688; 267/21 R, 21 A

[56] References Cited

U.S. PATENT DOCUMENTS

| | | | |
|---|---|---|---|
| 427,357 | 5/1890 | Peck | 267/52 |
| 1,901,287 | 3/1933 | Corriveau | 267/52 |
| 1,956,877 | 5/1934 | Prouty | 280/90 |
| 2,155,939 | 4/1939 | Jacob | 267/19 A |
| 4,213,632 | 7/1980 | Stotz | 280/715 |
| 4,267,896 | 5/1981 | Hendriksen | 280/724 |

Primary Examiner—Joseph F. Peters, Jr.
Assistant Examiner—John A. Carroll
Attorney, Agent, or Firm—Saul Schwartz

[57] ABSTRACT

An axle attachment for a vehicle having an axle housing disposed transversely of the vehicle and a control arm supported on the vehicle for pivotal movement about a first transverse axis, the attachment including a flange on the axle housing disposed between spaced parallel surfaces on the control arm, a bolt supporting the flange on the control arm for pivotal movement about a second transverse axis, a pair of apertures in the flange at first and second radial distances from the second axis and angularly spaced by a first angle of separation, and two pairs of aligned apertures in the spaced parallel surfaces at radial distances equal to the first and second radial distances and spaced angularly by a second angle of separation exceeding the first so that registry between the apertures in the flange and corresponding ones of the pairs of apertures in the parallel surfaces occurs at different relative angular orientation between the axle housing and the control arm.

3 Claims, 3 Drawing Figures

VEHICLE AXLE ATTACHMENT

BACKGROUND OF THE INVENTION

1. Field of the Invention

This invention relates generally to vehicle suspensions and more particularly to a novel arrangement for mounting driven axles of commercial vehicles such as trucks.

2. Description of Prior Art

Driven axle assemblies for commercial vehicles typically include an axle housing within which are carried a pair of axle shafts and differential gearing. Excursion control devices, such as control arms, connect the axle housing to the vehicle body and constrain the housing to move in a predetermined path during suspension excursions. Springs of conventional design resiliently support the body or sprung mass on the axle assembly or unsprung mass. A propeller shaft assembly typically connects the transmission of the vehicle to the differential pinion shaft which is supported on the axle housing for rotation on an axis defined by the housing. The propeller shaft assembly includes one or more universal joints which function to permit some angular misalignment between the axis of rotation of the pinion shaft and the axis of the propeller shaft. However, it is advantageous to reduce this misalignment to a minimum and to this end adjustable connecting means are known for attaching the axle housing to the excursion control means or to the springs. In the past these adjustable connecting means have typically involved U-bolt type clamps, wedge type shims or spline arrangements.

SUMMARY OF THE INVENTION

A vehicle suspension system according to this invention incorporates a novel arrangement for effecting angular adjustment between an axle housing and the excursion control means attaching the housing to the vehicle body so that optimum angular alignment between the pinion shaft and the propeller shaft may be obtained. Accordingly, the primary feature of this invention is that it provides a vehicle suspension system having a novel axle housing attachment arrangement. Another feature of this invention is that it provides a novel axle housing attachment arrangement particularly suited for suspension systems of commercial vehicles such as trucks. Still another feature of this invention resides in the provision in the novel attaching arrangement of a plurality of sequentially registerable apertures which permit small angular adjustments while still permitting an acceptably rigid connection between the axle housing and the excursion control means. Yet another feature of this invention resides in the provision of a flange on the axle housing and spaced parallel surfaces on the excursion control means, the flange being pivotally attached between the parallel surfaces and a pair of angularly spaced apertures in the flange cooperating with similar pairs of aligned angularly spaced apertures in the parallel surfaces which are differently angularly spaced than the flange apertures to provide registry at two different relative angular positions of the axle housing and the excursion control means.

These and other features of this invention will be readily apparent from the following specification and from the drawings wherein.

Figure 1:
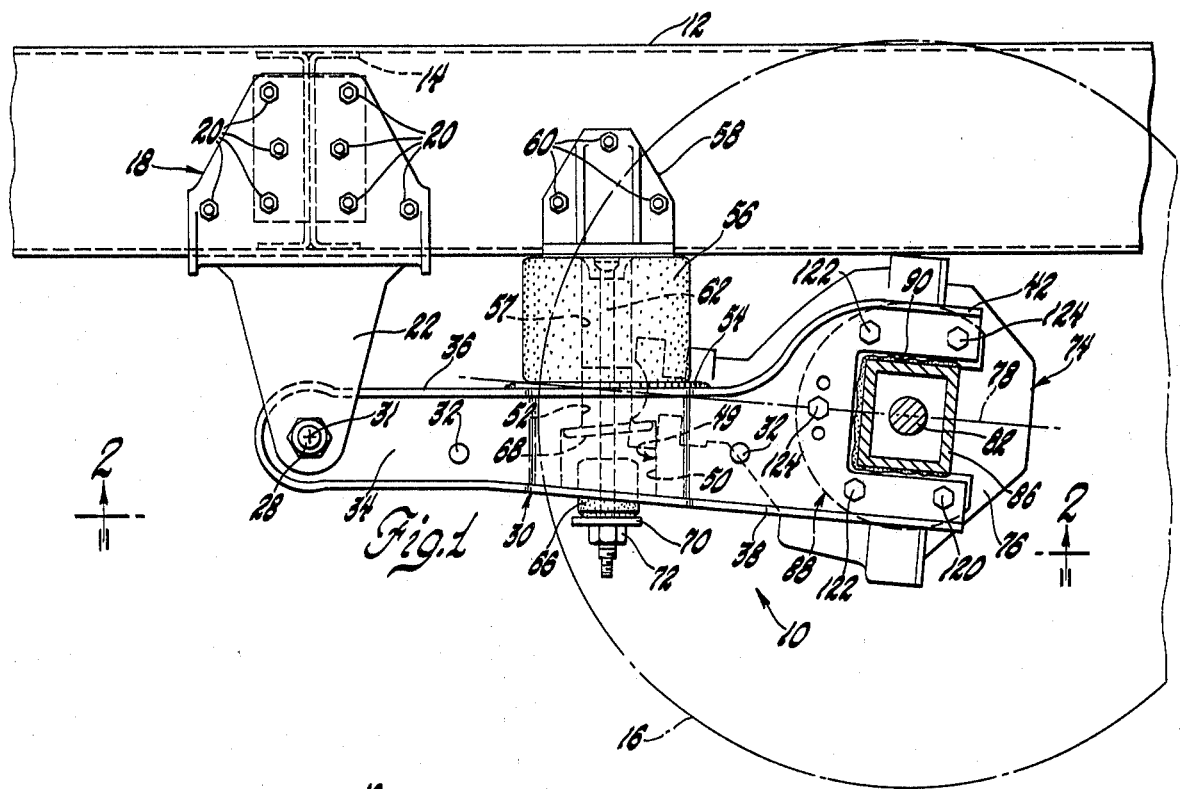
FIG. 1 is a partially broken away side elevational view of a vehicle suspension having an axle attachment according to this invention.

Referring to FIG. 1 of the drawings, a suspension system according to this invention and designated generally 10 is adapted to support a vehicle sprung mass on conventional road wheels. In FIG. 1, the sprung mass portion of the vehicle is represented by a left side longitudinally extending frame rail 12. A similar longitudinal frame rail, not shown, is disposed on the right side of the vehicle parallel to the rail 12 and connected to the latter by a plurality of cross members, only cross member 14 being shown in FIGS. 1 and 2. The frame rails and cross members form a rigid platform adapted to support a body arrangement, not shown. Road wheels represented by schematic wheel outline 16 are disposed on opposite sides of the vehicle and, through the suspension system 10, support the sprung mass portion of the vehicle relative to the pavement. It will be understood, of course, that the suspension system 10 is generally symmetrical with respect to the longitudinal center plane of the vehicle and, for convenience, only the left side will be described hereinafter.

Figure 2:
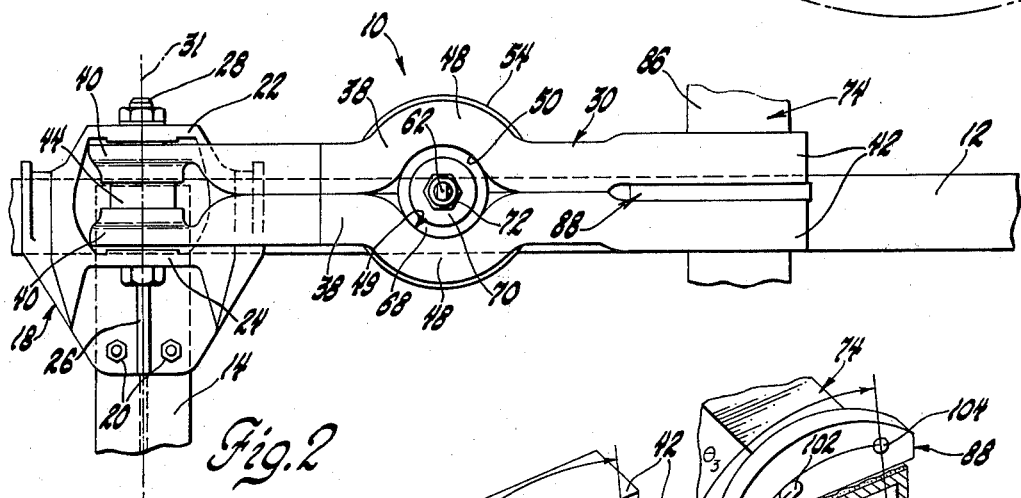
FIG. 2 is a view taken generally along the plane indicated by line 2—2 in FIG. 1.

As seen best in FIGS. 1 and 2, the suspension system 10 includes a pivot support bracket 18 rigidly attached to the frame rail 12 and the cross member 14 by a plurality of conventional fasteners 20. The bracket 18 straddles the frame rail and includes a pair of laterally spaced depending ears 22 and 24, ear 24 being reinforced by an integral rib 26. A pivot bolt 28 extending between the ears 22 and 24 supports an axle housing excursion control means in the form of a control arm 30 for pivotal movement about a first transverse axis 31 of the vehicle.

Figure 3:
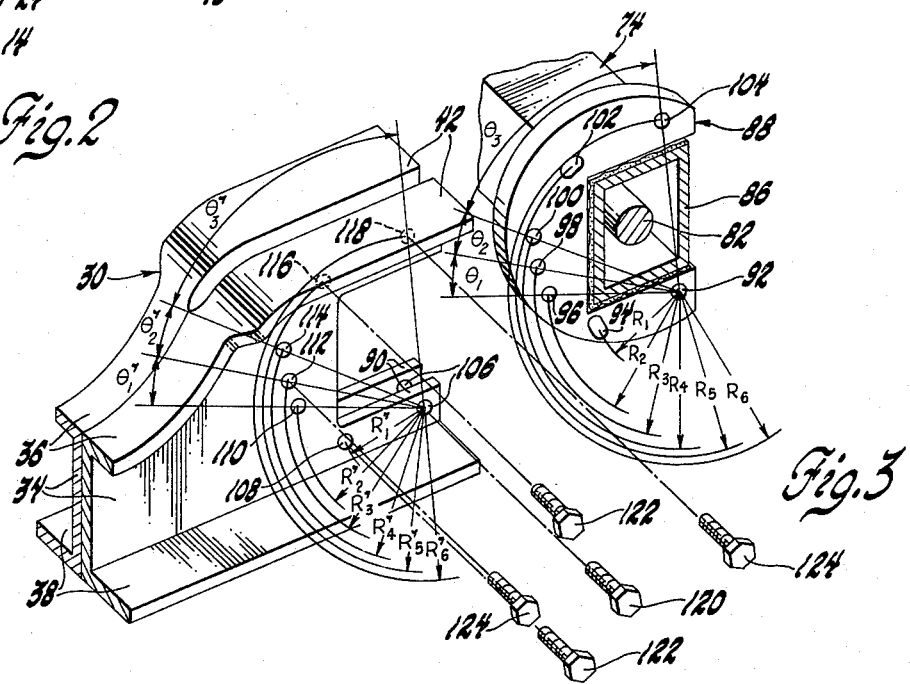
FIG. 3 is a partially broken away, exploded, perspective view of a portion of FIG. 1.

Referring now to FIGS. 1, 2 and 3 the control arm 30 is an assembly fabricated from mirror image halves fastened together by conventional means, as by rivets 32. Each half includes a vertical web section 34 having an integral upper flange 36 and an integral lower flange 38. As seen best in FIGS. 2 and 3, the halves 38 diverge at one end to form a pair of spaced lugs 40 and diverge at the opposite end to form another pair of spaced lugs 42. The lugs 40 receive a bushing assembly 44 through which passes the pivot bolt 28 so that the control arm 30 is thereby supported on the sprung mass portion of the vehicle for pivotal movement in a vertical plane about generally transverse axis 31 defined by the pivot bolt.

Intermediate their ends, the control arm halves diverge at 48 to form a generally cylindrical stepped bore 49 having a large diameter portion 50 and a small diameter portion 52. Immediately above the small diameter portion 52 a circular plate 54 is rigidly attached, as by welding, to the surface defined by the upper flanges 36 of the control arm. A cylindrical elastomeric spring 56 having a central bore 57 is disposed between the circular plate 54 and an abutment 58 rigidly attached to the frame rail 12 by a plurality of fasteners 60. As is apparent from FIG. 1, the elastomeric spring 56 functions as a compression member between the control arm 30 and the frame rail 12 to resiliently support the sprung mass in known manner and to cushion jounce or counterclockwise deflection of the control arm.

A rebound control rod 62 depends from the lower surface of the abutment 58 and projects through the bore 57 in the elastomeric spring, through a central aperture, not shown, in the circular plate 54, and through the stepped bore 49 in the control arm 30. A cylindrical rebound bumper 66 is disposed over the lower end of the rebound control rod 62 and is captured between a first washer 68 seated on the shoulder defined between the large diameter portion 50 and the small diameter portion 52 of the stepped bore 49 and a second or retaining washer 70. The second washer 70 is held on the rebound control rod 62 by a nut 72 threadedly received on the end of the rod. The bumper 66 and control rod 62 function to limit rebound rotation of the control arm 30 in the clockwise direction, FIG. 1, by effecting engagement between the bumper and the circular washer 68. An axle housing 74 is disposed transversely of the vehicle and includes a differential carrier portion 76 located generally at the longitudinal centerline of the vehicle. The differential carrier portion defines a pinion shaft axis 78 on which the carrier rotatably supports the differential pinion shaft, not shown. In known manner, the pinion shaft is adapted to be driven by the vehicle propeller shaft, not shown, through conventional universal joint means, also not shown. The pinion shaft drives conventional differential gearing within a differential carrier portion 76 which gearing in turn drives a pair of laterally extending axle shafts, only left axle shaft 82 being shown in FIGS. 1 and 3. Each laterally extending axle shaft is enclosed within a corresponding laterally extending arm of the axle housing 74 integral with the differential carrier portion 76, only left arm 86 being shown in the Figures. The axle housing is connected to the control arm 30 by a novel arrangement now to be described.

As seen best in FIGS. 2 and 3, a generally C-shaped flange 88 is rigidly attached to the arm 86 of the axle housing by conventional means, as by welding. The flange 88 is adapted for disposition between the spaced lugs 42 of the control arm 30 with the arm 86 generally reposing within a pair of aligned rectangular slots 90 in respective ones of the web sections 34 of each half of the control arm. The flange 88 includes a datum or pivot aperture 92 generally in the lower right quadrant thereof. The flange 88 further includes a first elongated slot 94 oriented in an arc about the center of pivot aperture 92 at a radial distance denominated $R_1$, a first connecting aperture 96 at a radial distance from the center of pivot aperture 92 denominated $R_2$, a second connecting aperture 98 at a radial distance denominated $R_3$, a third connecting aperture 100 at a radial distance $R_4$, a second elongated slot 102 disposed in an arc about the center of pivot aperture 92 at a radial distance therefrom designated $R_5$, and a fourth connecting aperture 104 at a radial distance $R_6$. As seen best in FIG. 3, the first connecting aperture 96 is angularly spaced from the second connecting aperture 98 by a first angle of separation $\theta_1$, the third connecting aperture 100 is spaced from the second connecting aperture 98 by a second angle of separation designated $\theta_2$, and the fourth connecting aperture 104 is spaced from the third connecting aperture 100 by a third angle of separation $\theta_3$.

Referring again to FIG. 3, the web sections 34 of the control arm contain a plurality of apertures aligned in pairs and corresponding generally to the apertures and slots in the flange 88. More particularly, the control arm includes a first pair of aligned apertures 106 corresponding to the pivot aperture 92, a second pair of aligned apertures 108 at a distance $R_1'$ from the center of the first pair 106, a third pair of aligned apertures 110 at a distance $R_2'$ from the center of the first pair, a fourth pair of aligned apertures 112 at a distance $R_3'$ from the center of the first pair, a fifth pair of aligned apertures 114 at a distance $R_4'$ from the center of the first pair, a sixth pair of aligned apertures 116 at a distance $R_5'$ from the center of the first pair, and a seventh pair of aligned apertures 118 at a distance $R_6'$ from the center of the first pair. The third pair of aligned apertures 110 is spaced from the fourth pair 112 by an angle of separation designated $\theta_1'$, the fifth pair of aligned apertures 114 is spaced from the fourth pair 112 by an angle of separation designated $\theta_2'$, and the seventh pair of aligned apertures 118 is spaced from the fifth pair 114 by an angle of separation designated $\theta_3'$.

The axle housing 74 is adjustably connected to the control arm 30 in the following manner. The flange 88 is received between the spaced lugs 42 on the control arm 30 with the pivot aperture 92 in register with the first pair of aligned apertures 106. A conventional threaded fastener 120 is received in the registered apertures and thereby supports the flange 88 and the attached axle housing on the control arm for pivotal movement about a second generally transverse axis of the vehicle defined by the fastener 120. $R_1$ and $R_5$ equal, respectively, $R_1'$ and $R_5'$ so that the first elongated slot 94 registers with the second pair of aligned apertures 108 while the second elongated slot 102 registers with the sixth pair of aligned apertures 116. A pair of threaded fasteners 122 are received within respective ones of the registered slots and apertures so that the flange 88 pivots about the second transverse axis through an angle limited by the lengths of the slots 94 and 102. Accordingly, the fasteners 120 and 122 support the weight of the axle housing on the control arm while still permitting final angular adjustment therebetween to the optimum orientation of the differential pinion axis 78.

The distances $R_2$, $R_3$, $R_4$ and $R_6$ equal, respectively, the distances $R_2'$, $R_3'$, $R_4'$ and $R_6'$. Thus, there will be angular positions of the flange 88 and axle housing 74 relative to the control arm in which aperture 96 registers with the third pair of aligned apertures 110, aperture 98 registers with fourth pair of aligned apertures 112, aperture 100 registers with fifth pair of aligned apertures 114, and aperture 104 registers with seventh pair of aligned apertures 118. To effect angular adjustment, with only one of the sets of aperture in register at a time, the angle of separation $\theta_1'$ is selected to be slightly larger than the first angle of separation $\theta_1$. Similarly, the angle of separation $\theta_2'$ is preselected to be slightly larger than the second angle of separation $\theta_2$ and the angle of separation $\theta_3'$ is selected to be larger than the third angle of separation $\theta_3$. Accordingly, as the flange 88 is pivoted about the second transverse axis defined by fasteners 120, respective ones of the apertures in the flange will, in sequence, come into registry with corresponding ones of the pairs of aligned apertures in the control arm. In this way, the angular orientation of the pinion axis 78 is adjusted through small angular increments to optimum position for a particular application. When proper angular orientation is achieved a threaded fastener 124 is inserted into the registered apertures thereby to rigidly maintain the angular orientation of the axle housing relative to the control arm. When all of the fasteners 120, 122 and 124 are then tightened to proper torque specifications, the control arm and axle housing assembly form a rigid unit.

It is thus seen that, in the embodiment shown, in each angular orientation of the flange there are available four threaded fasteners for load carrying purposes. However, if it is desired to provide an increased load carrying capability at any one of the angular positions it is necessary only to adjust the angles of separation and the radial distances of the apertures such that in the desired angular orientation two sets of apertures are in register thereby providing a total of five threaded fasteners for load carrying purposes.

The embodiments of the invention in which an exclusive property or privilege is claimed are defined as follows:

1. In a suspension system for a vehicle having a sprung mass portion, an unsprung mass portion, and spring means disposed between said sprung and said unsprung mass portions, said unsprung mass portion including an axle housing disposed transversely of said vehicle and an axle excursion control means attached to said sprung mass portion for pivotal movement about a first generally transverse axis of said vehicle, the combination comprising, means connecting said axle housing to said excursion control means for relative pivotal movement about a second generally transverse axis of said vehicle, means defining a first aperture in a planar surface of said axle housing perpendicular to said second axis at a first radial distance from said second axis, means defining a second aperture in said axle housing planar surface at a second radial distance from said second axis, said first and said second aperture being spaced angularly by a first angle of separation, means on said excursion control means defining a third aperture in a planar surface perpendicular to said second axis at a radial distance from said second axis equal to said first radial distance, and means defining a fourth aperture in said excursion control means planar surface at a radial distance from said second axis equal to said second radial distance, said third and said fourth apertures being spaced angularly by a second angle of separation different from said first angle of separation so that registry between said first and said third apertures and between said second and said fourth apertures occurs at different relative angular orientations between said axle housing and said excursion control means.

2. In a suspension system for a vehicle having a sprung mass portion, an unsprung mass portion, and spring means disposed between said sprung and said unsprung mass portions, said unsprung mass portion including an axle housing disposed transversely of said vehicle and an axle excursion control means attached to said sprung mass portion for pivotal movement about a first generally transverse axis of said vehicle, the combination comprising, a flange rigidly attached to said axle housing, means on said excursion control means defining a fork having laterally spaced parallel surfaces, said flange being disposed between said parallel surfaces, pivot means between said flange and said parallel surfaces supporting said axle housing on said excursion control means for relative pivotal movement about a second generally transverse axis of said vehicle, a first aperture in said flange at a first radial distance from said second axis, a second aperture in said flange at a second radial distance from said second axis, said first and said second apertures being spaced angularly by a first angle of separation, a first pair of aligned apertures in said spaced parallel surfaces at a radial distance from said second axis equal to said first radial distance, a second pair of aligned apertures in said spaced parallel surfaces at a radial distance from said second axis equal to said second radial distance, said first pair of aligned apertures and said second pair of aligned apertures being spaced angularly by a second angle of separation different from said first angle of separation so that registry between said first aperture and said first pair of apertures and between said second aperture and said second pair of apertures occurs at different relative angular orientation between said axle housing and said excursion control means, and fastening means disposed in the registered ones of said apertures cooperating with said pivot means in rigidly attaching said axle housing to said excursion control means.

3. In a suspension system for a vehicle having a sprung mass portion, an unsprung mass portion, and spring means disposed between said sprung and said unsprung mass portions, said unsprung mass portion including an axle housing disposed transversely of said vehicle and an axle excursion control arm attached to said sprung mass portion for pivotal movement about a first generally transverse axis of said vehicle, the combination comprising, a flange rigidly attached to said axle housing, means on said control arm defining a fork having laterally spaced parallel surfaces, said flange being disposed between said parallel surfaces, a first aperture in said flange, a first pair of aligned apertures in said spaced parallel surfaces registering with said first aperture, first bolt means disposed in said registered apertures operative to support said axle housing on said control arm for relative pivotal movement about a second generally transverse axis of said vehicle, means defining a slot in said flange disposed on an arc about said second axis at a first radial distance from said second axis, a second pair of aligned apertures in said parallel surfaces at a radial distance from said second axis equal to said first radial distance, said slot in said flange registering with said second pair of aligned apertures, second bolt means disposed in said registered slot and apertures operative to permit limited relative angular displacement between said axle housing and said control arm and to rigidly connect said axle housing and said control arm, a second aperture in said flange at a second radial distance from said second axis, a third aperture in said flange at a third radial distance from said second axis, said second and said third apertures being spaced angularly by a first angle of separation, a third pair of aligned apertures in said spaced parallel surfaces at a radial distance from said second axis equal to said second radial distance, a fourth pair of aligned apertures in said spaced parallel surfaces at a radial distance from said second axis equal to said third radial distance, said second pair of aligned apertures and said third pair of aligned apertures being spaced angularly by a second angle of separation different from said first angle of separation so that registry between said second aperture and said third pair of apertures and between said third aperture and said fourth pair of apertures occur at different relative angular orientation between said axle housing and said excursion control arm, and third bolt means disposed in the registered ones of said apertures cooperating with said first and said second bolt means in rigidly attaching said axle housing to said excursion control arm.

* * * * *